United States Patent [19]

Arold et al.

[11] Patent Number: 4,778,151
[45] Date of Patent: Oct. 18, 1988

[54] SEALING VALVE FOR AIR DUCTS

[75] Inventors: Klaus Arold; Heinz Koukal, both of Sindelfingen, Fed. Rep. of Germany

[73] Assignee: Daimler-Benz Aktiengesellschaft, Stuttgart, Fed. Rep. of Germany

[21] Appl. No.: 139,083

[22] Filed: Dec. 23, 1987

Related U.S. Application Data

[63] Continuation of Ser. No. 935,204, Nov. 26, 1986, abandoned.

[30] Foreign Application Priority Data

Nov. 26, 1985 [DE] Fed. Rep. of Germany ....... 3541650

[51] Int. Cl.$^4$ ............................................. B60H 1/26
[52] U.S. Cl. ..................................... 251/306; 251/305
[58] Field of Search ................ 251/305, 306, 307, 308

[56] References Cited

U.S. PATENT DOCUMENTS 3,111,300 11/1963 Boone, Sr. .......................... 251/306
3,666,235 5/1972 Scott ............................... 251/306 X
3,724,812 4/1973 Richardson ....................... 251/306
4,176,823 12/1979 Gliatas ............................ 251/306

Primary Examiner—A. Michael Chambers
Assistant Examiner—John C. Fox
Attorney, Agent, or Firm—Barnes & Thornburg

[57] ABSTRACT

A sealing device is provided for sealing the bearing journal area of a rotatable flap within the housing of an air guiding duct which sealing device allows for a reliable sealing, increased rotational mobility of the flap and a saving of material cost and weight. The sealing device is formed with a sealing lip arranged over and extending around approximately half the circumference of a bearing journal creating a front-side sealing surface disposed against the interior wall of a housing. The sealing device is connected to the bearing journals and flap body by the engagement of connecting pieces into holes provided in the flap body and a flange provided on a bearing collar all displaced from the interior wall of the housing.

18 Claims, 1 Drawing Sheet 4,778,151

SEALING VALVE FOR AIR DUCTS

This is a continuation of application Ser. No. 935,204, filed Nov. 26, 1986, now abandoned.

BACKGROUND AND SUMMARY OF THE INVENTION

The invention relates to a sealing device for rotatable flaps for air guiding ducts contained within a housing particularly of a heating and/or air conditioning system of a motor vehicle.

Such sealing devices have been contemplated involving enveloping the bearing area of the flap in rubber to create a sealing effect at the bearing area. A ring shaped front-side sealing surface is provided at the outer surface of the bearing journal disposed against the interior wall of the housing sealing the flap within the housing. Large frictional forces are thereby imparted at the bearing area resulting in the disadvantage that increased swivel motion is required to effect the rotation of the flap. Furthermore, because the sealing device envelops the entire bearing area, considerable material expenditures are necessary to provide the sealing device.

An objective of this invention is to provide a sealing device of the above-mentioned type with constructively simple elements with a reliable sealing obtained utilizing a minimum amount of material while also achieving the maximum rotational mobility of the flap.

This objective is achieved according to preferred embodiments of the invention by providing a sealing device which includes a flap body elements, a sealing elements for sealing the flap body element inside of the housing having a sealing lip element, a bearing journal element having a bearing collar element exhibiting a flange, and sealing device connecting element for connecting the sealing device to the flap body element and to the bearing journal element.

When the sealing lip is arranged over only approximately half of the circumference of the bearing journal, tapering at an angle upward toward the interior wall of the housing forming a front-side sealing surface which extends as a half-ring shaped member disposed against the interior wall of the housing, there is permitted a reliable sealing effect at the area of the bearing utilizing the minimum amount of material. Because the element for connecting the sealing device to the bearing journal element and to the flap body are arranged below the sealing lip element and behind the front-side sealing surface displaced from the interior wall of the housing, only the front-side sealing surface contacts the interior wall of the housing thereby minimizing the frictional forces occurring at the bearing area permitting maximal rotational mobility of the flap.

In an especially preferred embodiment of the invention, the sealing lip is formed from rubber sprayed around the flap body and which also reaches into the areas of connection of the sealing device to the bearing journals and to the flap body to effect a secure connection and to prevent the sealing device from being readily torn off of the flap body upon rotation.

In certain preferred embodiments of the invention, the sealing lip is formed from a synthetic material sprayed around the flap body which also reaches into the areas of connection.

Other objects, advantages and novel features of the present invention will become apparent from the following detailed description of the invention when considered in conjunction with the accompanying drawings.

DETAILED DESCRIPTION OF THE DRAWINGS

Figure 1:
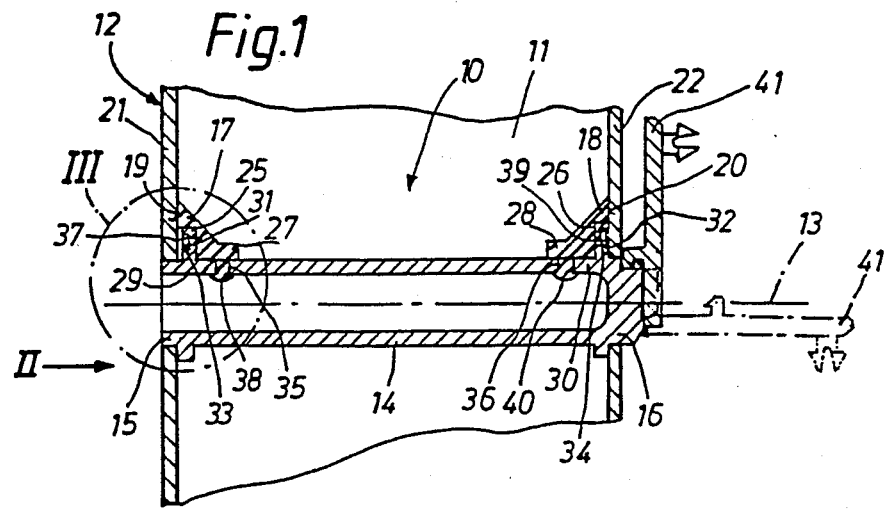
FIG. 1 is a schematic view which shows a sealing device for a flap constructed in accordance with a preferred embodiment of the invention.
Figure 2:
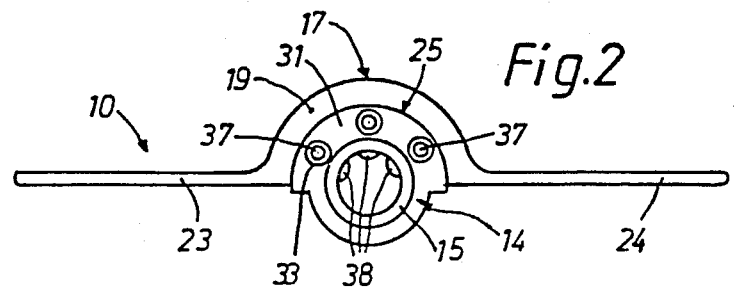
FIG. 2 is a schematic part-sectional view which shows the flap and sealing device taken from the direction of the arrow indicated as II of FIG. 1 with the wall of the housing removed for the sake of clarity.
Figure 3:
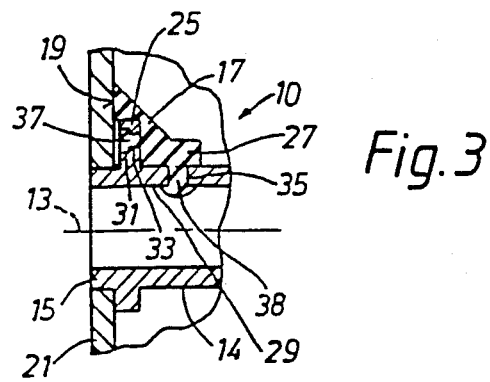
FIG. 3 is an enlarged schematic part-sectional view which shows the sealing device taken at the area indicated as III of FIG. 1.

FIGS. 1 to 3 show a flap 10 that is held in a housing 12 forming an air guiding duct 11 so that it can be pivoted around an axis 13. The air guiding duct 11 may, for example, be one of a heating and/or air-conditioning system of a vehicle, particularly of a motor vehicle.

The flap 10 has a flap body 14 that on both ends is equipped with bearing journals 15 and 16. The flap body 14, at least in the area of both bearing journals 15 and 16, is equipped with a sealing device. The sealing device has a sealing lip 17 and 18 for each bearing journal 15, 16, and the sealing lip extends around the bearing journal 15 and 16 only over approximately half of its circumference. The sealing lip 17 and 18, with a front-side sealing surface 19 and 20 in a sealing manner rests against the interior side of the housing wall 21 and 22 in which the flap bearing takes place by means of the bearing journal 15 and 16. Each sealing lip 17, 18 extends approximately in a semicircle and in this way extends over the upper half of the respective bearing journal 15 and 16, as shown particularly in FIG. 2 for the end of the flap body 14 that is on the left in FIG. 1. This also shows that on both sides of the sealing lip 17, 18, straight sections 23, 24 spaced approximately 180° apart are connected to the sealing lip 17, 18 and held at a respective end of the flap body 14.

Each bearing journal 15, 16 has a bearing collar 25 and 26 extending over an angle at the circumference of approximately 180°. The sealing lip 17, 18 sits on the respective bearing collar 25, 26. A half-ring part 27, 28 of the sealing lip 17, 18 connects axially with it resting on a cylinder section 29, 30 of the flap body 14 that is adjacent to the bearing collar 25, 26. Each bearing collar 15, 16 has a flange 31, 32 that extends over an angle at the circumference of about 180° and is axially set back with respect to the radial plane within which the respective front-side sealing surface 19 and 20 of the sealing lip 17 and 18 extends. Each flange 31, 32 has axially through-going holes 33 and 34. The cylinder section 29, 30 is provided with radial holes 35, 36. Each sealing lip 17, 18 therefore has shaped parts 37, 38 and 39, 40 that engage in the assigned holes 33, 35 and 34, 36, and preferably reach completely through these holes. Each sealing lip 17, 18 preferably consists of rubber that is sprayed around the flap body 15, the shaped parts 37–40 during the spraying at the same time reaching into the holes 33 to 36 while filling them out and thus providing a form-fitting connection and that also counteracts a possible tearing-off of the sealing lip 17 and 18. Because the flange 31, 32 is axially set back with respect to the front-side sealing surface 19 and 20, the axially aimed shaped parts 37 and 39 with their free front surfaces are also set back with respect to the sealing surface 19 and 20, so that they do not rest against the facing surface of the housing wall 21, 22 and cannot interfere with the free movability of the flap body 14 during the pivoting. Because the sealing lip 17, 18 extends only over half the bearing area of each bearing journal 15 and 16, and thus for sealing purposes a sealing surface is effective that extends only over an angle at circumference of about 180°, the frictional forces are reduced between the sealing surface 19, 20 and the housing wall 21, 22 whereby the flap body 14 can be adjusted around the axis 13 with better movability. The required swivel moments are therefore reduced. In addition, weight, material and therefore costs are saved.

The flap body 14, at one end (right side, FIG. 1) has a radially projecting lever 41 located outside the housing 12 that is connected in one piece in a hinged manner via a film with the flap body 14.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. A sealing device for rotatable flaps for air guiding ducts within a housing having an interior wall surface, comprising:
    flap body means;
    bearing journal means for rotationally supporting the flap body means at the housing, said bearing journal means having a circumference; and
    sealing lip means for sealing the flap body means inside the housing, said sealing lip means including an outer surface sealing portion adjacent to and facing the housing interior wall surface, said sealing lip means outer surface sealing portion including a first surface section sealingly disposed against the housing interior wall surface and a second surface section recessed away from the housing interior wall surface, said sealing lip means extending from and around only a portion of the circumference of the bearing journal means, said second surface section of the sealing lip means outer surface sealing portion being disposed in between the first surface section and the bearing journal means.

2. An arrangement according to claim 1, wherein the flap body means includes opposing ends, said bearing journal means being disposed at the opposing ends of the flap body means, said bearing journal means including bearing collar means supporting the sealing lip means at each opposing end.

3. An arrangement according to claim 2, wherein the bearing collar means is disposed around approximately a first half of the circumference of the bearing journal means, and wherein the sealing lip means extend in a taper toward the housing from each respective bearing collar means.

4. An arrangement according to claim 3, wherein a flange means is formed on the bearing collar means as a half-ring shaped member extending over approximately the first half of the circumference of the bearing journal means and is spaced from the housing.

5. An arrangement according to claim 4, wherein the sealing lip means is arranged over and seated on the bearing journal means extending approximately over the first half of the circumference of the bearing journal means and includes two opposing straight sealing lip sections extending radially out from the first half circumference approximately 180° apart.

6. An arrangement according to claim 5, further including means for connecting the sealing lip means to the flap body means and to the bearing journal means including connecting pieces arranged on the sealing lip means to be received into and reach through a first set of holes arranged on the flange means and through a second set of holes arranged on the flap body means.

7. An arrangement according to claim 6, wherein the flap body means includes a cylinder section extending between the opposing ends, the first set of holes being axially arranged through the flange means relative to the flap body means and the second set of holes are radially arranged through the cylinder section relative to the flap body means.

8. A flap arrangement for air guiding ducts, particularly for a heating and/or air-conditioning system of a motor vehicle, having a flap body equipped on both ends with bearing journals having a circumference inserted into a housing having an interior wall surface to pivot about the bearing journals and having a sealing device at an area of the bearing journals, said flap arrangement comprising:
    the sealing device having a sealing lip extending from and around approximately only a first half of the circumference of each bearing journal, said sealing lip including an outer surface sealing portion adjacent to and facing the housing interior wall surface, said sealing lip outer surface sealing portion including a first surface section sealingly disposed against the housing interior wall surface and a second surface section recessed from the housing interior wall surface, said second surface section of the sealing lip outer surface sealing portion being disposed in between the first surface section and the bearing journal.

9. An arrangement according to claim 8, wherein each sealing lip is formed approximately in the shape of a semi-circle.

10. An arrangement according to claim 9, wherein the bearing journal includes an upper half and a lower half, each sealing lip extending over the upper half of the respective bearing journal.

11. An arrangement according to claim 10, wherein each sealing lip extends approximately over an angle and extends on either side of the bearing journal forming straight sealing lip sections arranged along an outer end of the flap body adjacent the housing and wherein the straight sealing lip sections are connected to the flap body.

12. An arrangement according to claim 11, wherein shaped parts are formed on each sealing lip and reach into and through recesses formed in the flap body.

13. An arrangement according to claim 12, wherein a bearing collar is formed on each bearing journal extending around approximately half of the circumference of the bearing journal over an angle and wherein the sealing lip is disposed against the bearing collar.

14. An arrangement according to claim 13, wherein a flange is formed on the bearing collar extending over the bearing collar at an angle at a circumference of approximately 180° and wherein the first section of the sealing lip outer portion includes a front-side sealing surface disposed against an interior wall of the housing and wherein the flange is axially set back from the frontside sealing surface and the housing.

15. An arrangement according to claim 14, wherein a half-ring part is formed on the sealing lip resting on a cylinder section of the flap body at an area adjacent to the bearing collar.

16. An arrangement according to claim 15, wherein the shaped parts formed in the sealing lip reach into and through axial holes formed into the flange and into and through radial holes formed in the cylinder section of the flap body.

17. An arrangement according to claim 16, wherein the sealing lip is formed from rubber or a synthetic material and wherein the rubber or synthetic material is sprayed around the flap body.

18. A sealing device for rotatable flaps for air guiding ducts within a housing having an interior wall surface, comprising:
- flap body means;
- bearing journal means for rotationally supporting the flap body means at the housing, said bearing journal means having a circumference;
- flange means extending from said bearing journal means spaced from the interior wall surface of the housing;
- sealing lip means for sealing the flap body means inside the housing, said sealing lip means including an outer surface sealing portion facing the housing interior wall surface, said sealing lip means outer surface sealing portion including a first surface section sealingly disposed against the housing interior wall surface and a second surface section recessed away from the housing interior wall surface, said sealing lip means extending from and around only a portion of the circumference of the bearing journal means, said second surface section of the sealing lip means outer surface sealing portion being disposed in between the first surface section and the bearing journal means.

* * * * *